US012244099B2

(12) United States Patent
Morgan et al.

(10) Patent No.: US 12,244,099 B2
(45) Date of Patent: Mar. 4, 2025

(54) SOCKET CONNECTOR

(71) Applicants: TE Connectivity Solutions GmbH, Schaffhausen (CH); TYCO ELECTRONICS JAPAN G.K., Kawasaki (JP)

(72) Inventors: Chad William Morgan, Carneys Point, NJ (US); Hirotate Kadobayashi, Kawasaki (JP); Hiroshi Shirai, Kawasaki (JP)

(73) Assignee: TE CONNECTIVITY SOLUTIONS GmbH ET AL., Schaffhausen (CH)

( * ) Notice: Subject to any disclaimer, the term of this patent is extended or adjusted under 35 U.S.C. 154(b) by 350 days.

(21) Appl. No.: 17/841,597

(22) Filed: Jun. 15, 2022

(65) Prior Publication Data

US 2023/0411906 A1 Dec. 21, 2023

(51) Int. Cl.
*H01R 13/24* (2006.01)
*H01R 13/11* (2006.01)
*H01R 13/6471* (2011.01)

(52) U.S. Cl.
CPC ......... *H01R 13/6471* (2013.01); *H01R 13/11* (2013.01); *H01R 13/24* (2013.01)

(58) Field of Classification Search
None
See application file for complete search history.

(56) References Cited

U.S. PATENT DOCUMENTS

| | | | | |
|---|---|---|---|---|
| 9,048,591 B2 * | 6/2015 | Chang | ................ | H01R 13/6597 |
| 10,135,199 B1 * | 11/2018 | Ju | ....................... | H01R 12/7082 |
| 10,276,956 B2 * | 4/2019 | Huang | ............... | H01R 13/6587 |
| 10,403,992 B1 * | 9/2019 | Mason | ............... | H01R 13/2442 |
| 12,051,865 B2 * | 7/2024 | Morgan | ............. | H01R 13/2435 |
| 2004/0253846 A1 * | 12/2004 | Brown | .................... | H01L 24/72 257/E23.078 |
| 2011/0294308 A1 * | 12/2011 | Kuwata | .................. | H01R 12/62 439/55 |

FOREIGN PATENT DOCUMENTS

| | | | |
|---|---|---|---|
| CN | 111244701 A * | 6/2020 | ........... H01R 12/714 |

* cited by examiner

*Primary Examiner* — Tho D Ta

(57) ABSTRACT

A socket connector includes a substrate having signal and ground contact channels between upper and lower surfaces and ground bar slots. The socket connector includes signal socket contacts received in signal contact channels and ground socket contacts received in ground contact channels. The socket connector includes ground bars received in corresponding ground bar slots. The ground bars electrically connect the corresponding ground socket contacts.

20 Claims, 9 Drawing Sheets

SOCKET CONNECTOR

BACKGROUND OF THE INVENTION

The subject matter herein relates generally to data communication systems.

Electrical interconnects are used to connect two opposing electronic devices. For instance, electrical interconnects may be provided between two circuit boards or a circuit board and another electronic device or pluggable module to transmit data and/or power therebetween. Some known electrical interconnects use dual compression socket connectors to define separable mating interfaces at both the upper interface and the lower interface for repeated mating and unmating of the components. As the data rates of communication systems increase, conventional electrical interconnects are unable to meet the demands for electrical performance of the systems. For example, the socket connector may have a relatively tall height in order to provide sufficient working range for the socket contacts of the socket connector. The height leads to long electrical paths between the circuit boards, which degrades the electrical performance of the electrical interconnect.

A need remains for a socket connector that can perform at higher data rates than conventional interconnects in a reliable manner.

BRIEF DESCRIPTION OF THE INVENTION

In one embodiment, a socket connector is provided and includes a substrate having an upper surface and a lower surface. The substrate includes signal contact channels between the upper and lower surfaces and ground contact channels between the upper and lower surfaces. The substrate includes ground bar slots. The socket connector includes signal socket contacts received in the corresponding signal contact channels. Each signal socket contact includes a signal contact body, an upper signal mating element, and a lower signal mating element. The signal upper mating element is deflectable relative to the contact body and extends to the upper surface to interface with a first electrical component. The lower signal mating element is deflectable relative to the contact body and extends to the lower surface to interface with a second electrical component. The socket connector includes ground socket contacts received in the corresponding ground contact channels. Each ground socket contact includes a ground contact body, an upper ground mating element, and a lower ground mating element. The ground upper mating element is deflectable relative to the contact body and extends to the upper surface to interface with a first electrical component. The lower ground mating element is deflectable relative to the contact body and extends to the lower surface to interface with a second electrical component. The socket connector includes ground bars received in corresponding ground bar slots. The ground bars electrically connecting the corresponding ground socket contacts.

In another embodiment, a socket connector is provided and includes a substrate having an upper surface and a lower surface. The substrate includes signal contact channels between the upper and lower surfaces and ground contact channels between the upper and lower surfaces. The substrate includes ground bar slots. The socket connector includes signal socket contacts received in the corresponding signal contact channels. Each signal socket contact includes a signal contact body, an upper signal mating element, and a lower signal mating element. The signal upper mating element is deflectable relative to the contact body and extends to the upper surface to interface with a first electrical component. The lower signal mating element is deflectable relative to the contact body and extends to the lower surface to interface with a second electrical component. The socket connector includes ground socket contacts received in the corresponding ground contact channels. Each ground socket contact includes a ground contact body, an upper ground mating element, and a lower ground mating element. The ground upper mating element is deflectable relative to the contact body and extends to the upper surface to interface with a first electrical component. The lower ground mating element is deflectable relative to the contact body and extends to the lower surface to interface with a second electrical component. The ground socket contacts include connecting tabs extending between corresponding ground socket contacts. The socket connector includes ground bars received in corresponding ground bar slots. The ground bars electrically engaging the corresponding connecting tabs between the corresponding ground socket contacts to electrically connect the corresponding ground socket contacts.

In a further embodiment, a socket connector is provided and includes a substrate having an upper surface and a lower surface. The substrate includes signal contact channels between the upper and lower surfaces and ground contact channels between the upper and lower surfaces. The substrate includes upper ground bar slots open at the upper surface and lower ground bar slots open at the lower surface. The socket connector includes signal socket contacts received in the corresponding signal contact channels. Each signal socket contact includes a signal contact body, an upper signal mating element, and a lower signal mating element. The signal upper mating element is deflectable relative to the contact body and extends to the upper surface to interface with a first electrical component. The lower signal mating element is deflectable relative to the contact body and extends to the lower surface to interface with a second electrical component. The socket connector includes ground socket contacts received in the corresponding ground contact channels. Each ground socket contact includes a ground contact body, an upper ground mating element, and a lower ground mating element. The ground upper mating element is deflectable relative to the contact body and extends to the upper surface to interface with a first electrical component. The lower ground mating element is deflectable relative to the contact body and extends to the lower surface to interface with a second electrical component. The socket connector includes upper ground bars received in the corresponding upper ground bar slots. The ground bars electrically connecting the corresponding ground socket contacts. The socket connector includes lower ground bars received in the corresponding lower ground bar slots. The lower ground bars electrically connecting the corresponding ground socket contacts.

DETAILED DESCRIPTION OF THE INVENTION

Figure 1:
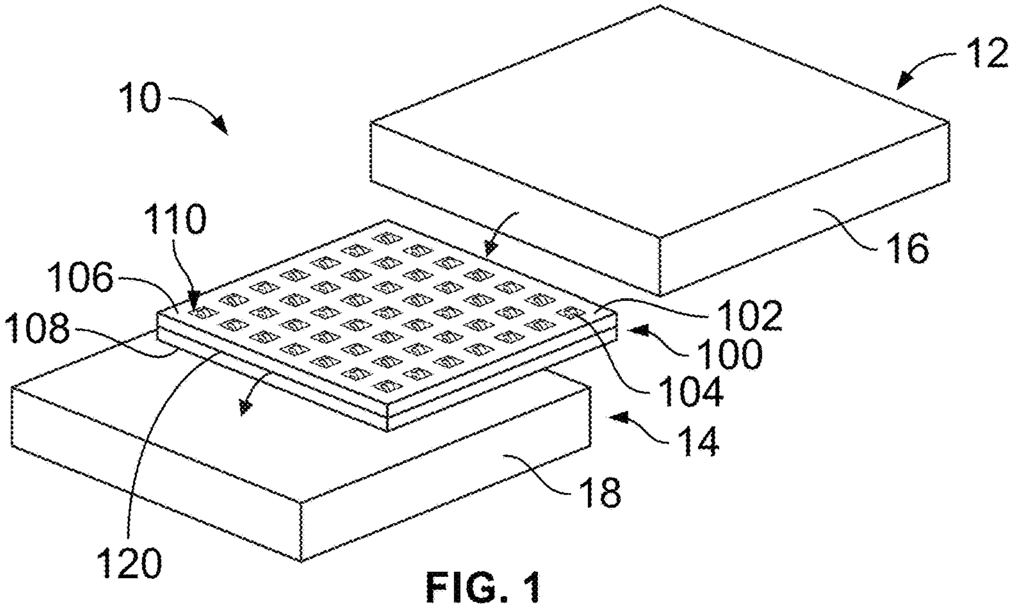
FIG. 1 illustrates an electronic assembly including a socket connector in accordance with an exemplary embodiment.

FIG. 1 illustrates an electronic assembly 10 including a socket connector 100 in accordance with an exemplary embodiment. The socket connector 100 is used to electrically connect a first electrical component 12 and a second electrical component 14. In an exemplary embodiment, the first electrical component 12 includes a first circuit board 16 and the second electrical component 14 includes a second circuit board 18. The socket connector 100 is an interposer between the first circuit board 16 and the second circuit board 18. In an exemplary embodiment, the socket connector 100 includes a ground structure between the first and second circuit boards 16, 18. The ground structure is used to improve electrical performance of the socket connector 100. The ground structure provides a ground reference at a location(s) (for example, height) between the first and second circuit boards 16, 18, which raises the first frequency of resonance for insertion loss, return loss, near-end crosstalk, far-end crosstalk, and the like beyond a target frequency, such as 60 GHz, to improve electrical performance of the socket connector 100.

The socket connector 100 is electrically connected between the first circuit board 16 and the second circuit board 18. In an exemplary embodiment, the socket connector 100 is compressible between the first circuit board 16 and the second circuit board 18. The socket connector 100 includes a dual compressive interface that is compressible against the first circuit board 16 and compressible against the second circuit board 18. In various embodiments, the first circuit board 16 may be part of an electrical component, such as a chip, an ASIC, a processor, a memory module or other component.

The socket connector 100 includes a substrate 102 holding a plurality of socket contacts 104. In an exemplary embodiment, the socket contacts 104 are stamped and formed contacts. The substrate 102 extends between an upper surface 106 and a lower surface 108. The socket contacts 104 are received in corresponding contact channels 110 to pass through the substrate 102 between the upper surface 106 and the lower surface 108. In an exemplary embodiment, the socket contacts 104 include signal socket contacts 122 and ground socket contacts 124. The ground socket contacts 124 are arranged between corresponding signal socket contacts 122 to provide shielding for the corresponding signal socket contacts 122. In various embodiments, the signal socket contacts 122 are arranged in pairs, which are surrounded (for example, ringed) by the ground socket contacts 124. In an exemplary embodiment, the contact channels 110 include signal contact channels 126 that receive corresponding signal socket contacts 122 and ground contact channels 128 that receive corresponding ground socket contacts 124.

In an exemplary embodiment, the socket connector 100 includes at least one ground band 120 to improve electrical performance of the socket connector 100. The ground band(s) 120 electrically connect the ground socket contacts 124 at an interior location within the substrate 102 to increase first frequency of resonance that occurs with insertion loss, return loss, near-end crosstalk, far-end crosstalk, and the like beyond a target frequency, such as 60 GHz, to improve electrical performance of the socket connector 100. The ground band 120 is used to electrically common the ground socket contacts 124 at an intermediary vertical location remote from the first electrical component 12 and remote from the second electrical component 14.

In various embodiments, the ground band 120 may be approximately centered vertically between the first and second electrical components 12, 14 and thus approximately centered vertically between the ground planes of the first and second electrical components 12, 14. In other various embodiments, multiple ground bands may be provided, such as an upper ground band and a lower ground band, which may be positioned approximately equi-distant vertically from each other and equi-distant vertically from the ground planes of the first and second electrical components 12, 14.

Figure 2:
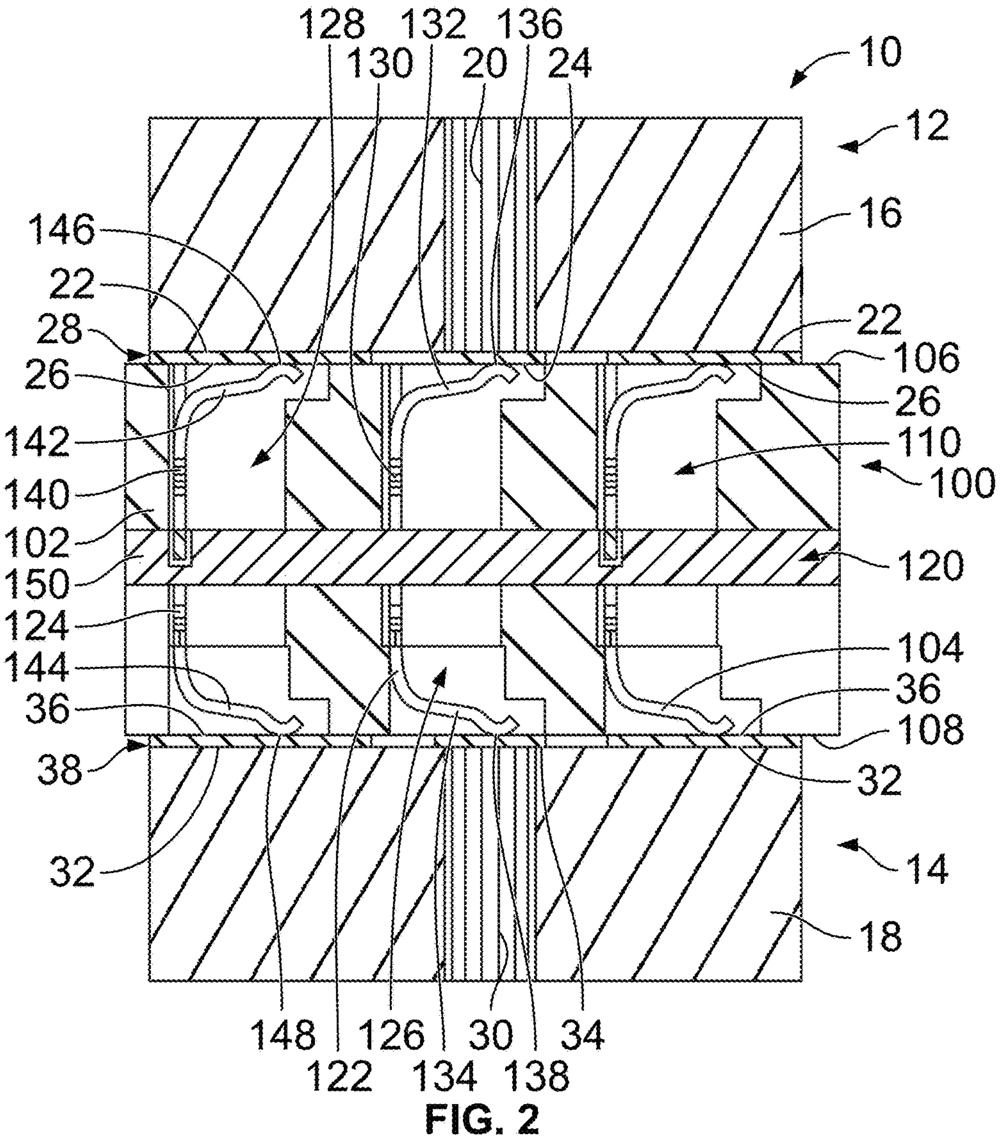
FIG. 2 is a cross-sectional view of the electronic assembly in accordance with an exemplary embodiment showing the socket connector connected between the first and second electrical components.
Figure 3:
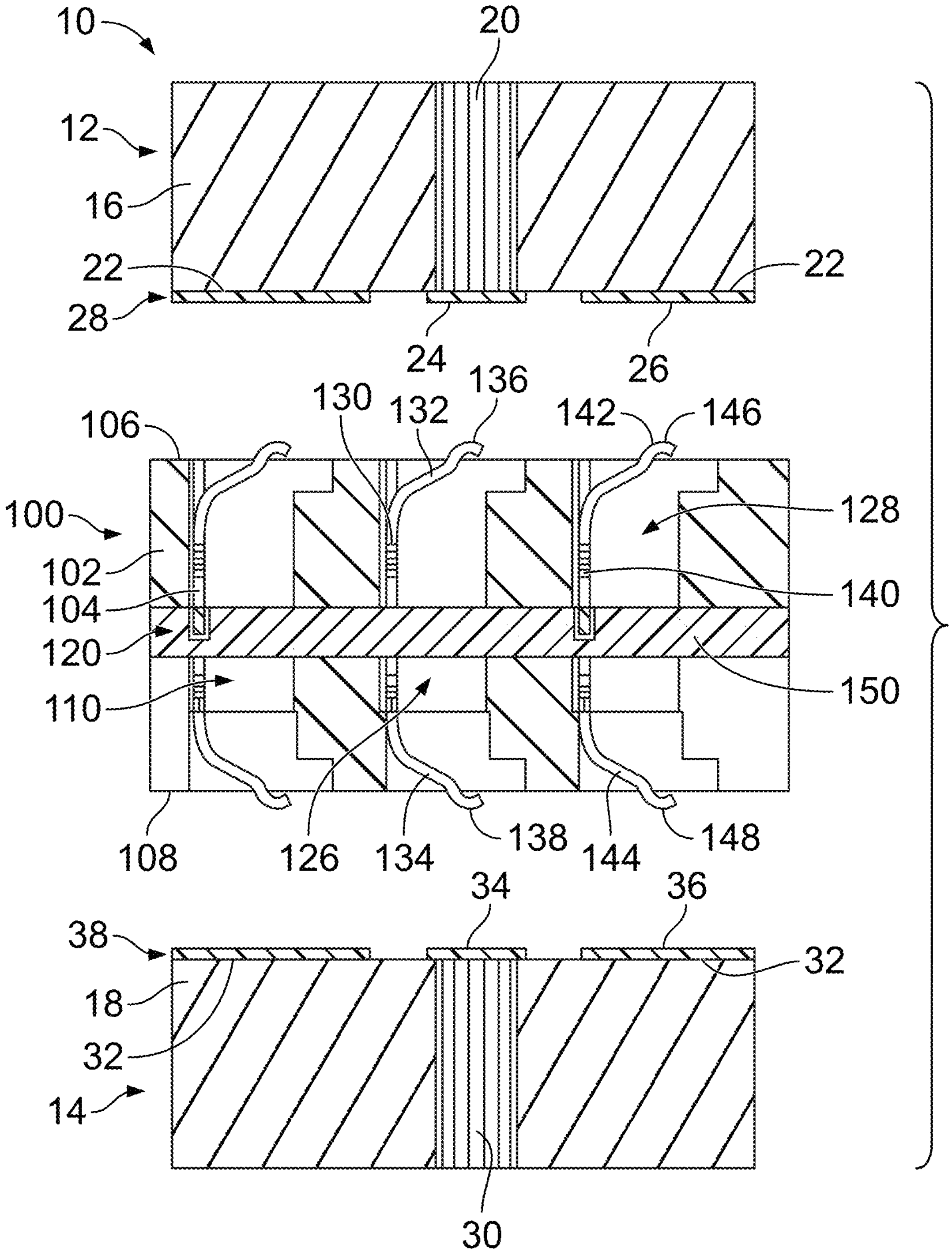
FIG. 3 is an exploded view of the electronic assembly in accordance with an exemplary embodiment.

FIG. 2 is a cross-sectional view of the electronic assembly in accordance with an exemplary embodiment showing the socket connector 100 connected between the first and second electrical components 12, 14. FIG. 3 is an exploded view of the electronic assembly 10 in accordance with an exemplary embodiment. In an exemplary embodiment, the first electrical component 12 includes the first circuit board 16 and the second electrical component 14 includes the second circuit board 18. During assembly, the socket connector 100 is stacked between the first and second electrical components 12, 14 to electrically connect the first and second circuit boards 16, 18.

The first circuit board 16 is located above the socket connector 100 and may be referred to hereinafter as upper circuit board 16. The upper circuit board 16 includes upper signal contacts 20 and upper ground contacts 22. The upper signal contacts 20 are defined by one or more circuits of the upper circuit board 16, such as traces, vias, pads, and the like. In an exemplary embodiment, the upper signal contact 20 includes a signal contact pad 24 at the bottom surface of the upper circuit board 16 configured to be electrically connected to the corresponding socket contact 104 of the socket connector 100. The upper ground contacts 22 are defined by one or more circuits of the upper circuit board 16, such as traces, vias, pads, and the like. In an exemplary embodiment, the upper ground contact 22 includes a ground contact pad 26 at the bottom surface of the upper circuit board 16 configured to be electrically connected to the corresponding socket contact 104 of the socket connector 100. In an exemplary embodiment, the upper circuit board 16 includes an upper ground plane 28 electrically connecting each of the upper ground contacts 22. In various embodiments, the upper ground plane 28 may be provided at the bottom surface of the upper circuit board 16. Optionally, multiple upper ground planes 28 may be provided at different layers of the upper circuit board 16.

The second circuit board 18 is located below the socket connector 100 and may be referred to hereinafter as lower circuit board 18. The lower circuit board 18 includes lower signal contacts 30 and lower ground contacts 32. The lower signal contacts 30 are defined by one or more circuits of the lower circuit board 18, such as traces, vias, pads, and the like. In an exemplary embodiment, the lower signal contact 30 includes a signal contact pad 34 at the top surface of the lower circuit board 18 configured to be electrically connected to the corresponding socket contact 104 of the socket connector 100. The lower ground contacts 32 are defined by one or more circuits of the lower circuit board 18, such as traces, vias, pads, and the like. In an exemplary embodiment, the lower ground contact 32 includes a ground contact pad 36 at the top surface of the lower circuit board 18 configured to be electrically connected to the corresponding socket contact 104 of the socket connector 100. In an exemplary embodiment, the lower circuit board 18 includes a lower ground plane 38 electrically connecting each of the lower ground contacts 32. In various embodiments, the lower ground plane 38 may be provided at the top surface of the lower circuit board 18. Optionally, multiple lower ground planes 38 may be provided at different layers of the lower circuit board 18.

The socket connector 100 includes the substrate 102 and the socket contacts 104. In an exemplary embodiment, the socket contacts 104 are stamped and formed contacts configured to be inserted (for example, pressed, stitched, or otherwise loaded) into the corresponding contact channels 110 of the substrate 102. The socket contacts 104 extend to the upper surface 106 to interface with the upper circuit board 16 and extend to the lower surface 108 to interface with the lower circuit board 18. In an exemplary embodiment, the socket contacts 104 have separable mating interfaces at the upper and lower ends to interface with the upper and lower circuit boards 16, 18. The socket contacts 104 are compressible such that the upper and lower ends of the socket contacts 104 are deflected when interfacing with the upper and lower circuit boards 16, 18. As such, the socket contacts 104 are spring biased against the upper and lower circuit boards 16, 18 to maintain electrical connection with the upper and lower circuit boards 16, 18.

In an exemplary embodiment, the substrate 102 is manufactured from a dielectric material. The substrate 102 may be molded, such as from a molded polymer material. The substrate 102 may be nylon, liquid crystal polymer (LCP), polybutylene terephthalate (PBT), or other suitable substrate material. The substrate 102 may use glass reinforcement fibers, which may be in a random orientation. The substrate may be a layered structure.

In an exemplary embodiment, the signal socket contacts 122 are stamped and formed contacts. Each signal socket contact 122 includes a signal contact body 130, an upper signal mating element 132 extending from the top of the signal contact body 130, and a lower signal mating element 134 extending from the bottom of the signal contact body 130. The signal mating elements 132, 134 are deflectable relative to the signal contact body 130. The signal contact body 130 is configured to be stitched or otherwise loaded into the substrate 102. The signal contact body 130 may be secured to the substrate 102 by an interference fit. For example, barbs or other features may engage the substrate 102 to hold the signal socket contact 122 in the substrate 102. The upper signal mating element 132 extends to the upper surface 106 to interface with the first electrical component 12. The upper signal mating element 132 includes an upper mating interface 136 configured to engage the upper circuit board 16 (for example, to engage the corresponding contact pad at the bottom of the upper circuit board 16). The lower signal mating element 134 extends to the lower surface 108 to interface with the second electrical component 14. The lower signal mating element 134 includes a lower mating interface 138 configured to engage the lower circuit board 18 (for example, to engage the corresponding contact pad at the top of the lower circuit board 18).

In an exemplary embodiment, the upper signal mating element 132 is a spring beam or a mating beam and may be referred to hereinafter as an upper signal mating beam 132. In an exemplary embodiment, the lower signal mating element 134 is a spring beam or mating beam and may be referred to hereinafter as a lower signal mating beam 134. The mating beams 132, 134 may be deflectable spring beams. However, other types of mating elements may be used in alternative embodiments. For example, the socket contacts 104 may be conductive elastomeric columns having upper portions defining the upper signal mating elements 132 and lower portions defining the lower signal mating elements 134.

In an exemplary embodiment, the ground socket contacts 124 are stamped and formed contacts. Each ground socket contact 124 includes a ground contact body 140, an upper ground mating element 142 extending from the top of the ground contact body 140, and a lower ground mating element 144 extending from the bottom of the ground contact body 140. The ground mating elements 142, 144 are deflectable relative to the ground contact body 140. The ground contact body 140 is configured to be stitched or otherwise loaded into the substrate 102. The ground contact body 140 may be secured to the substrate 102 by an interference fit. For example, barbs or other features may engage the substrate 102 to hold the ground socket contact 124 in the substrate 102. The upper ground mating element 142 extends to the upper surface 106 to interface with the first electrical component 12. The upper ground mating element 142 includes an upper mating interface 146 configured to engage the upper circuit board 16 (for example, to engage the corresponding contact pad at the bottom of the upper circuit board 16). The lower ground mating element 144 extends to the lower surface 108 to interface with the second electrical component 14. The lower ground mating element 144 includes a lower mating interface 148 configured to engage the lower circuit board 18 (for example, to engage the corresponding contact pad at the top of the lower circuit board 18).

In an exemplary embodiment, the upper ground mating element 142 is a spring beam or a mating beam and may be referred to hereinafter as an upper ground mating beam 142. In an exemplary embodiment, the lower ground mating element 144 is a spring beam or mating beam and may be referred to hereinafter as a lower ground mating beam 144. The mating beams 142, 144 may be deflectable spring beams. However, other types of mating elements may be used in alternative embodiments. For example, the socket contacts 104 may be conductive elastomeric columns having upper portions defining the upper ground mating elements 142 and lower portions defining the lower ground mating elements 144.

In an exemplary embodiment, a plurality of the socket contacts 104 (for example, multiple signal socket contacts 122 and/or multiple ground socket contacts 124) may be stamped and formed from a common metal sheet. The plurality of the socket contacts 104 may be arranged on a strip, such as with a carrier strip between the corresponding socket contacts. In an exemplary embodiment, the signal contacts 122 are singulated from other socket contacts 104 by cutting the carrier strip. However, the ground socket contact 124 may remain on the carrier strip such that the ground socket contacts 124 remain mechanically and electrically connected together. The ground socket contacts 124 may be loaded into the substrate 102 on the carrier strip. The carrier strip remains to form part of the ground band 120.

When assembled, the signal socket contacts 122 are positioned in corresponding signal contact channels 126 and the ground socket contacts 124 are positioned in corresponding ground contact channels 128. The signal socket contacts 122 are configured to be electrically connected to corresponding signal contacts 20, 30 of the upper and lower circuit boards 16, 18. The ground socket contacts 124 are configured to be electrically connected to corresponding ground contacts 22, 32 of the upper and lower circuit boards 16, 18. The ground socket contacts 124 provide electrical shielding for the signal socket contacts 122. In various embodiments, the signal socket contacts 122 are arranged in pairs. The ground socket contacts 124 surround corresponding pairs of the signal socket contacts 122. The ground socket contacts 124 are electrically connected to the ground band 120. The ground band 120 is used to electrically common the ground socket contacts 124.

In an exemplary embodiment, each of the ground socket contacts 124 are electrically commoned at the upper ground plane 28, at the lower ground plane 38, and at the internal or intermediate ground band(s) 120 of the socket connector 100. The ground band 120 shortens the grounded electrical paths between the ground planes. For example, the lengths of the grounded electrical paths may be approximately cut in half by centering the ground band 120 between the upper ground plane 28 and the lower ground plane 38 (for example, compared to an electronic assembly utilizing a socket connector that does not include a ground plane). Electrical performance is enhanced with the inclusion of the ground band 120. For example, the ground band 120 increases in the minimum frequency of resonance for insertion loss, return loss, near-end crosstalk, far-end crosstalk, and the like beyond a target frequency, such as 60 GHz, to improve electrical performance of the socket connector 100.

In an exemplary embodiment, the socket connector 100 includes a plurality of ground bars 150 received in the substrate 102. The ground bars 150 form part of the ground band 120. The ground bars 150 electrically connect a plurality of the ground socket contacts 124. For example, the ground bars 150 may be electrically connected to the carrier strips between the ground socket contacts 124 to form the ground band 120. The ground bars 150 may be metal bars. The ground bars may be stamped and formed. The ground bars 150 are pressed into the substrate 102, such as to an internal location (for example, approximately centered in the substrate 102) to interface with the corresponding ground socket contacts 124. The ground bars 150 may be coupled to the ground socket contacts 124 (for example, to the carrier strips) by a press-fit or an interference fit.

Figure 4:
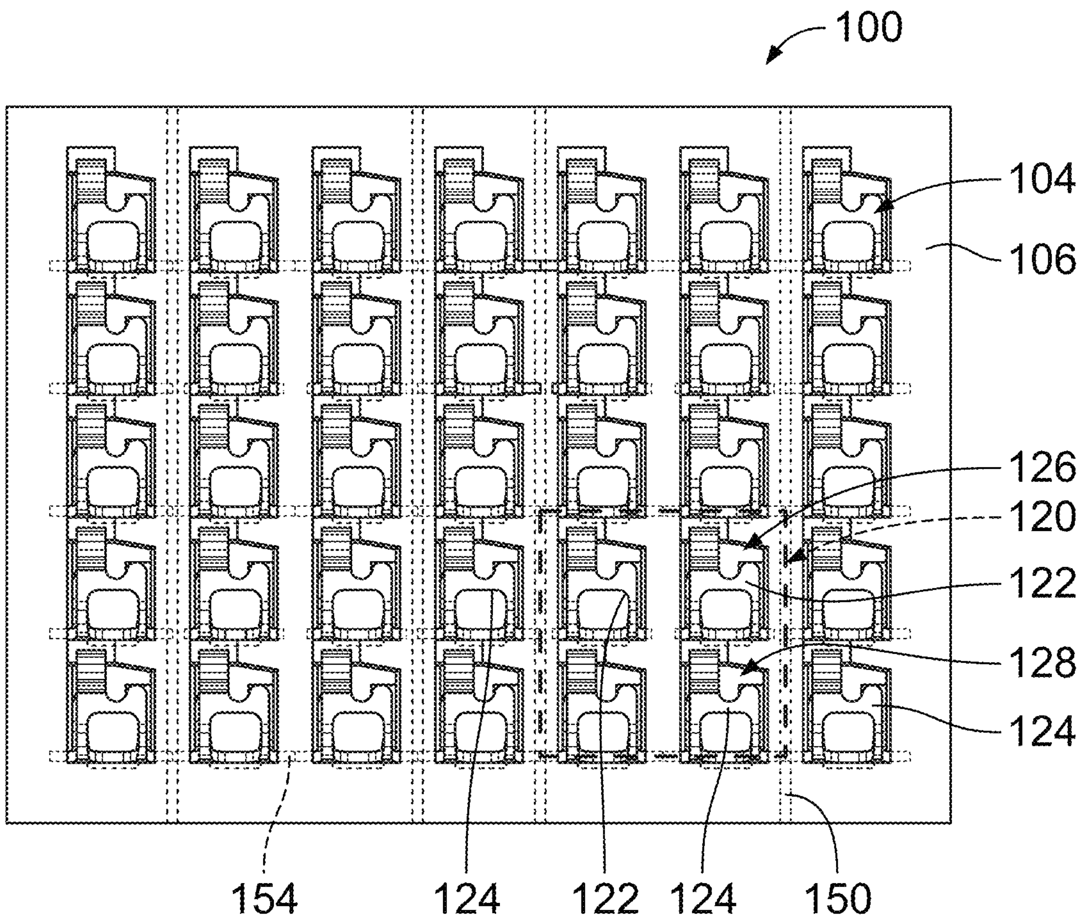
FIG. 4 is a top view of a portion of the socket connector in accordance with an exemplary embodiment.
Figure 6:
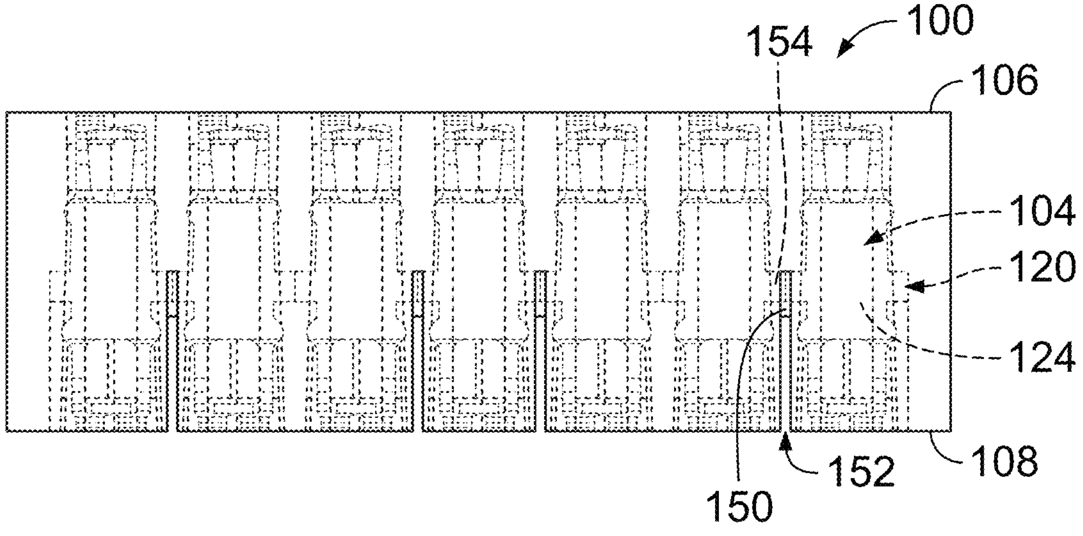
FIG. 6 is an end view of a portion of the socket connector in accordance with an exemplary embodiment.
Figure 5:
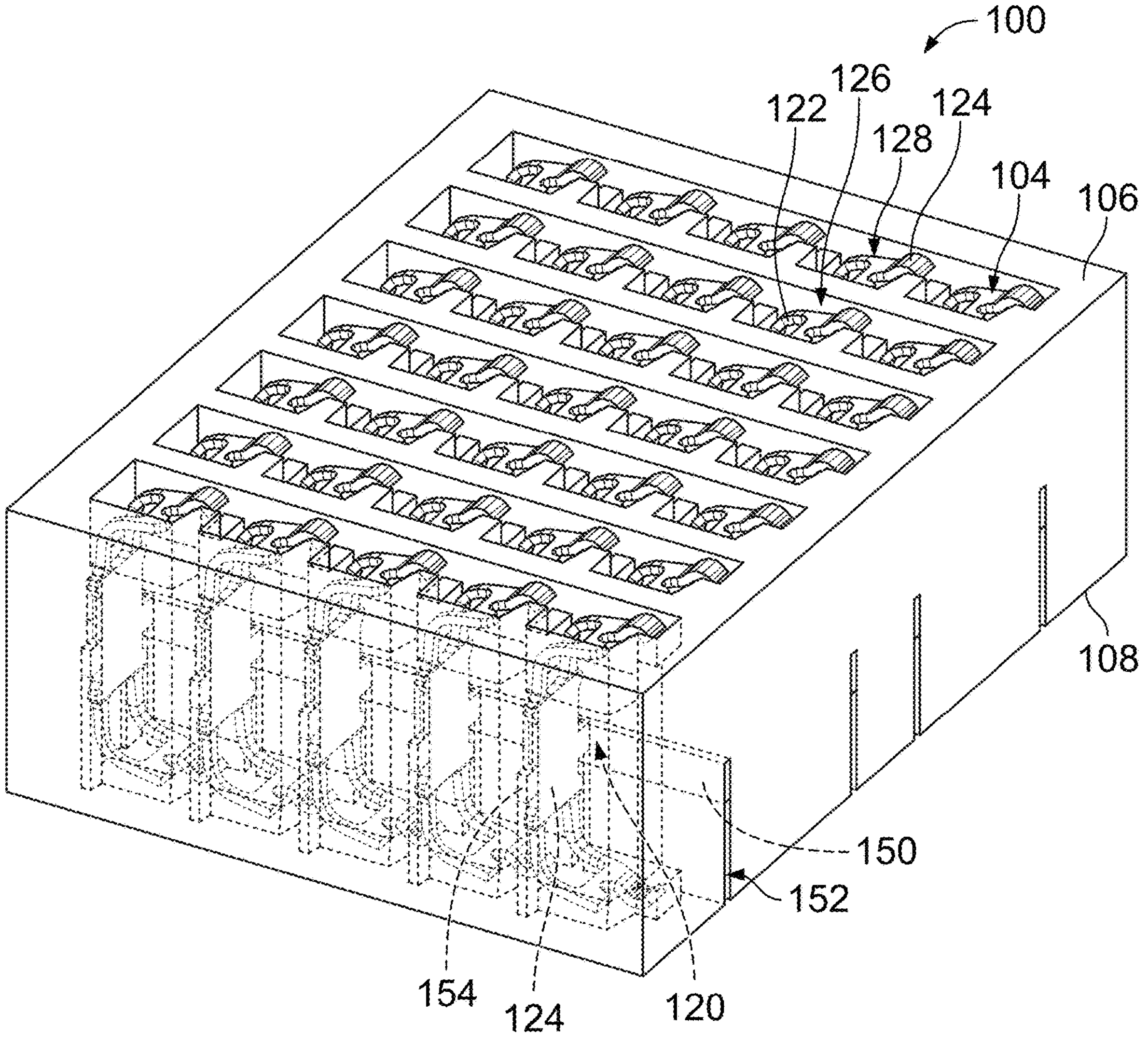
FIG. 5 is a perspective view of a portion of the socket connector in accordance with an exemplary embodiment.
Figure 7:
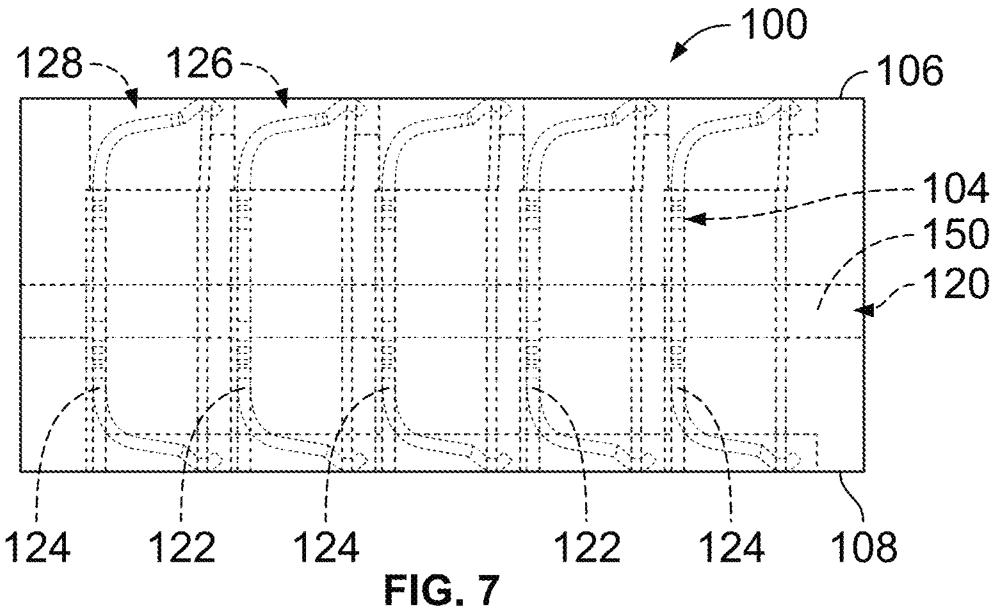
FIG. 7 is a side view of a portion of the socket connector in accordance with an exemplary embodiment.

FIG. 4 is a top view of a portion of the socket connector 100 in accordance with an exemplary embodiment. FIG. 5 is a perspective view of a portion of the socket connector 100 in accordance with an exemplary embodiment. FIG. 6 is an end view of a portion of the socket connector 100 in accordance with an exemplary embodiment. FIG. 7 is a side view of a portion of the socket connector 100 in accordance with an exemplary embodiment. FIGS. 4 and 5 illustrate an array of the socket contacts 104 showing the socket contacts 104 in a plurality of rows and a plurality of columns. FIG. 6 shows a portion of a row of the socket contacts 104. FIG. 7 shows a portion of a column of the socket contacts 104. FIGS. 4 and 5 illustrate a ring of ground socket contacts 124 surrounding a pair of signal socket contacts 122. For example, the ground socket contacts 124 are located in front of, behind, and on both sides of the pair of signal socket contacts 122. The ground socket contacts 124 electrically isolate each pair of signal socket contacts 122 from every other pair of the signal socket contacts 122. In the illustrated embodiment, the pair of signal socket contacts 122 are arranged in corresponding rows.

The signal socket contacts 122 are received in corresponding signal contact channels 126. The ground socket contacts 124 are received in corresponding ground contact channels 128. The signal contact channels 126 are aligned in the rows and the columns with the ground contact channels 128 to position the signal socket contacts 122 in the rows and columns with the ground socket contacts 124.

The ground bars 150 are received in corresponding ground bar slots 152. The ground bar slots 152 may be open at the upper surface 106 and/or may be open at the lower surface 108. In the illustrated embodiment, the ground bars 150 are oriented parallel to the columns. The ground bars 150 are located between (for example, offset from) the signal contact channels 126 and the ground contact channels 128.

In an exemplary embodiment, the ground band 120 includes connecting tabs 154 that extend from each of the ground socket contacts 124. The connecting tabs 154 extend from the ground contact channels 128, such as into the ground bar slots 152. The ground bars 150 are connected to the connecting tabs 154 to electrically connect to the ground socket contacts 124. In an exemplary embodiment, the ground bars 150 and the connecting tabs 154 electrically connect all of the ground socket contacts 124. In an exemplary embodiment, the connecting tabs 154 are integral with the ground socket contacts 124. For example, the connecting tabs 154 are formed by the carrier strips between the stamped and formed ground socket contacts 124, which are stamped with the ground socket contacts 124 from the metal sheet. In an exemplary embodiment, the signal socket contacts 122 do not include such connecting tabs thus isolating the signal socket contacts 122 from the ground band 120. For example, the connecting tabs are removed when the signal socket contacts are singulated from the carrier strip.

Figure 8:
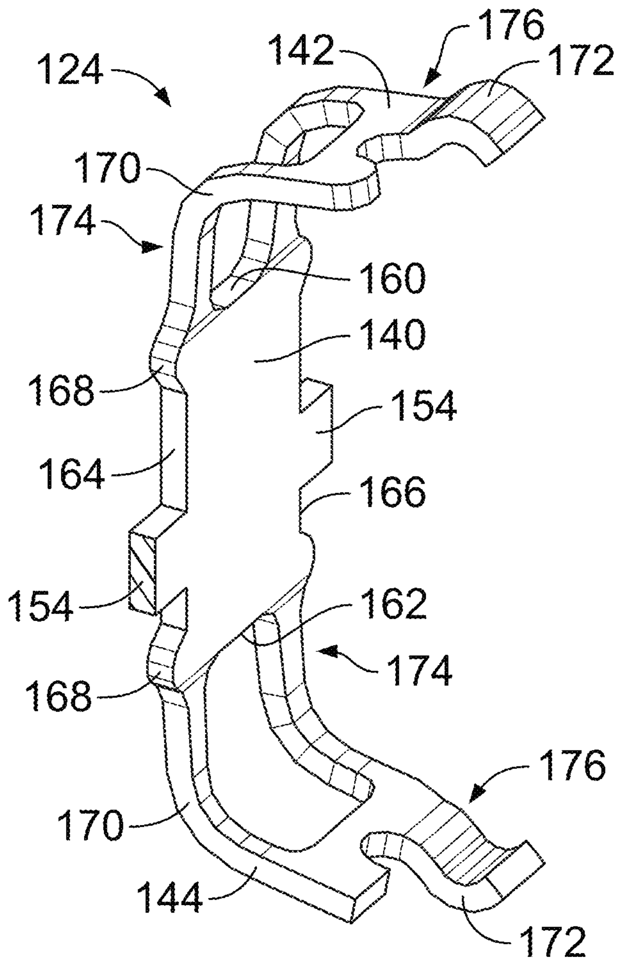
FIG. 8 is a front perspective view of the ground socket contact in accordance with an exemplary embodiment.

FIG. 8 is a front perspective view of the ground socket contact 124 in accordance with an exemplary embodiment. In various embodiments, the ground socket contact 124 may be similar to the signal socket contact 122 (shown in FIG. 4); however the signal socket contact 122 may have the connecting tabs 154 removed. In alternative embodiments, the signal socket contact 122 may include other different components or features.

The ground socket contact 124 is a stamped and formed contact stamped from a metal plate or blank material and then formed into a predetermined shape. In an exemplary embodiment, a plurality of the ground socket contacts 124 may be stamped from the same metal plate and connected by a carrier strip, which may extend between the ground socket contacts 124.

The ground socket contact 124 includes the contact body 140 and the upper and lower mating beams 142, 144 extending from the contact body 140. The contact body 140 may be approximately centered along the ground socket contact 124. For example, the upper and lower mating beams 142, 144 may have similar sizes and/or shapes. The mating beams 142, 144 are cantilevered from the contact body 140 and are deflectable relative to the main contact body 140.

The contact body 140 includes a top 160, a bottom 162, and opposite sides 164, 166. In an exemplary embodiment, the contact body 140 includes barbs 168 extending from the sides 164, 166. The barbs 168 are used to secure the ground socket contact 124 in the substrate 102 (shown in FIG. 4). In the illustrated embodiment, the barbs 168 are rounded protrusions. The barbs 168 may have other shapes in alternative embodiments, such as triangular shapes configured to pierce or cut into the dielectric material of the substrate 102.

Each mating beam 142, 144 includes an arm 170 and a finger 172 extending from the arm 170. The finger 172 defines a mating interface configured to be mated with the corresponding circuit board. The arm 170 is deflectable. In various embodiments, and the inner portion 174 of the arm 170 is generally coplanar with the contact body 140 and an outer portion 176 of the arm 170 is nonplanar with the contact body 140, such as being angled in a forward direction. The finger 172 extends from the outer portion 176 of the arm 170. The mating beams 142, 144 may have other shapes in alternative embodiments.

In an exemplary embodiment, the contact body 140 includes the connecting tabs 154 extending from the sides 164, 166. In various embodiments, the connecting tabs 154 are approximately centered between the top 160 and the bottom 162. The connecting tabs 154 may be coplanar with the contact body 140. The connecting tabs 154 are defined by the carrier strip. The connecting tabs 154 are integral with the contact body 140, such as being stamped from the same metal plate. The connecting tabs 154 form part of the ground band 120 (shown in FIG. 4). The connecting tabs 154 are configured to be electrically connected to the ground bar 150 (shown in FIG. 4).

Figure 9:
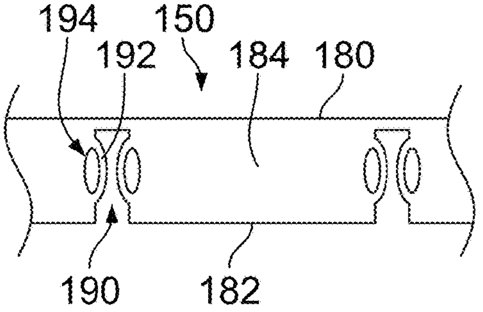
FIG. 9 is a side view of a portion of the ground bar in accordance with an exemplary embodiment.

FIG. 9 is a side view of a portion of the ground bar 150 in accordance with an exemplary embodiment. The ground bar 150 includes an upper edge 180 and a lower edge 182. The ground bar 150 includes sides 184 between the upper edge 180 and the lower edge 182. The ground bar 150 extends along a longitudinal axis. The ground bar 150 may be planar along the longitudinal axis.

In an exemplary embodiment, the ground bar 150 includes pockets 190. In the illustrated embodiment, the pockets 190 are open at the upper edge 180. However, the pockets 190 may be open at the lower edge 182 in alternative embodiments. The pockets 190 receive the connecting tabs 154 of the corresponding ground socket contacts 124 (shown in FIG. 8). The ground bar 150 is coupled to the ground socket contacts 124 at the pockets 190. In an exemplary embodiment, the ground bar 150 includes one or more compliant beams 192 extending into the pockets to interface with the connecting tabs 154. The complaint beams 192 are configured to engage the connecting tabs 154 by an interference fit. In the illustrated embodiment, the compliant beams 192 are simply supported beams supported at both ends by the ground bar 150. A relief space 194 is defined behind the complaint beam 192. The compliant beam 192 flexes into the relief space 194. The complaint beam 192 may be compressed when engaging the connecting tab 154 such that the compliant beam presses against the connecting tab 154 and maintains an electrical connection with the connecting tab 154 when mated thereto.

Figure 10:
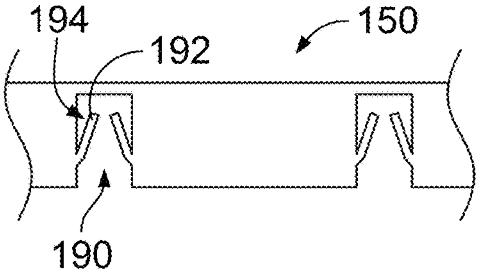
FIG. 10 is a side view of a portion of the ground bar in accordance with an exemplary embodiment.

FIG. 10 is a side view of a portion of the ground bar 150 in accordance with an exemplary embodiment. The ground bar 150 includes the pockets 190. In the illustrated embodiment, the compliant beams 192 are cantilevered beams. The distal ends of the complaint beams 192 are configured to engage the connecting tabs 154. The complaint beams 192 are deflectable into the relief space 194 behind the complaint beam 192. The compliant beam 192 is elastically deformed and urges outward against the connecting tab 154 when mated thereto to maintains an electrical connection with the connecting tab 154.

Figure 11:
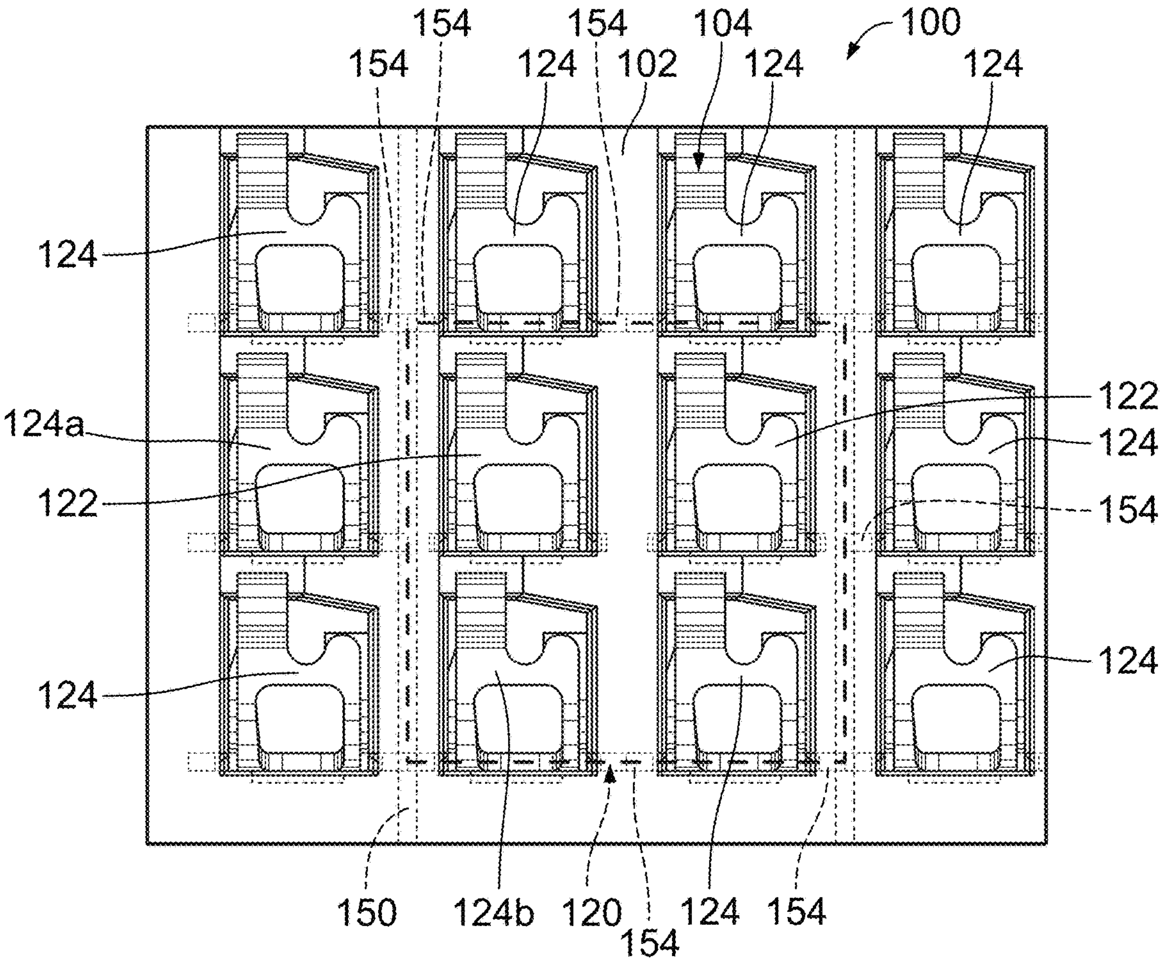
FIG. 11 is a top view of a portion of the socket connector in accordance with an exemplary embodiment showing a subset of the socket contacts.

FIG. 11 is a top view of a portion of the socket connector 100 in accordance with an exemplary embodiment showing a subset of the socket contacts 104. FIG. 11 shows a pair of the signal socket contacts 122 surrounded by a ring of the ground socket contacts 124. For example, ten ground socket contacts 124 surround the pair of the signal socket contacts 122. In an exemplary embodiment, the ground socket contacts 124 include flanking ground socket contacts **124*a* in line with the pairs of the signal socket contacts 122 and separating ground socket contacts 124*b* separating the pairs of the signal socket contacts, wherein the ground bars 150 connect the separating ground socket contacts 124*b* and the flanking ground socket contacts 124*a*. FIG. 11 shows the connecting tabs 154 and the ground bars 150 forming the ground band 120 around the pair of socket contacts 122. Each ground bar 150 is coupled to a plurality of the ground socket contacts 124**.

In an exemplary embodiment, the connecting tabs 154 are defined by the carrier strips used to connect the ground socket contacts 124 during the stamping and forming process. In an exemplary embodiment, the connecting tabs 154 are not singulated or separated from each other. Rather, the ground socket contacts 124 remain on the carrier strip, with the connecting tabs 154 in place, when the ground socket contacts 124 are loaded into the substrate 102. The ground socket contacts 124 in each row are electrically connected by the connecting tabs 154. During assembly, the signal socket contacts 122 are singulated from each other and from the ground socket contacts 124 in the same row. For example, during a stamping process, the connecting tabs of the signal socket contacts 122 are removed. The signal socket contacts 122 are electrically isolated from each other and from the ground socket contacts 124.

The ground bars 150 are positioned in the substrate 102 to electrically connect the ground socket contacts 124 in different rows. For example, the ground bars 150 extend parallel to the columns. The ground bars 150 are coupled to the connecting tabs 154 of corresponding ground socket contacts 124. For example, the connecting tabs 154 are received in the pockets 190 of the ground bars 150. The complaint beams 192 interface with the connecting tabs 154 to electrically connect to the ground socket contacts 124. The ground bars 150 and the connecting tabs 154 form the ground band 120, which forms a box around the signal socket contacts. In alternative embodiments, the connecting tabs 154 may additionally or alternatively include the pockets and the complaint beams that interface with the ground bar 150.

Figure 12:
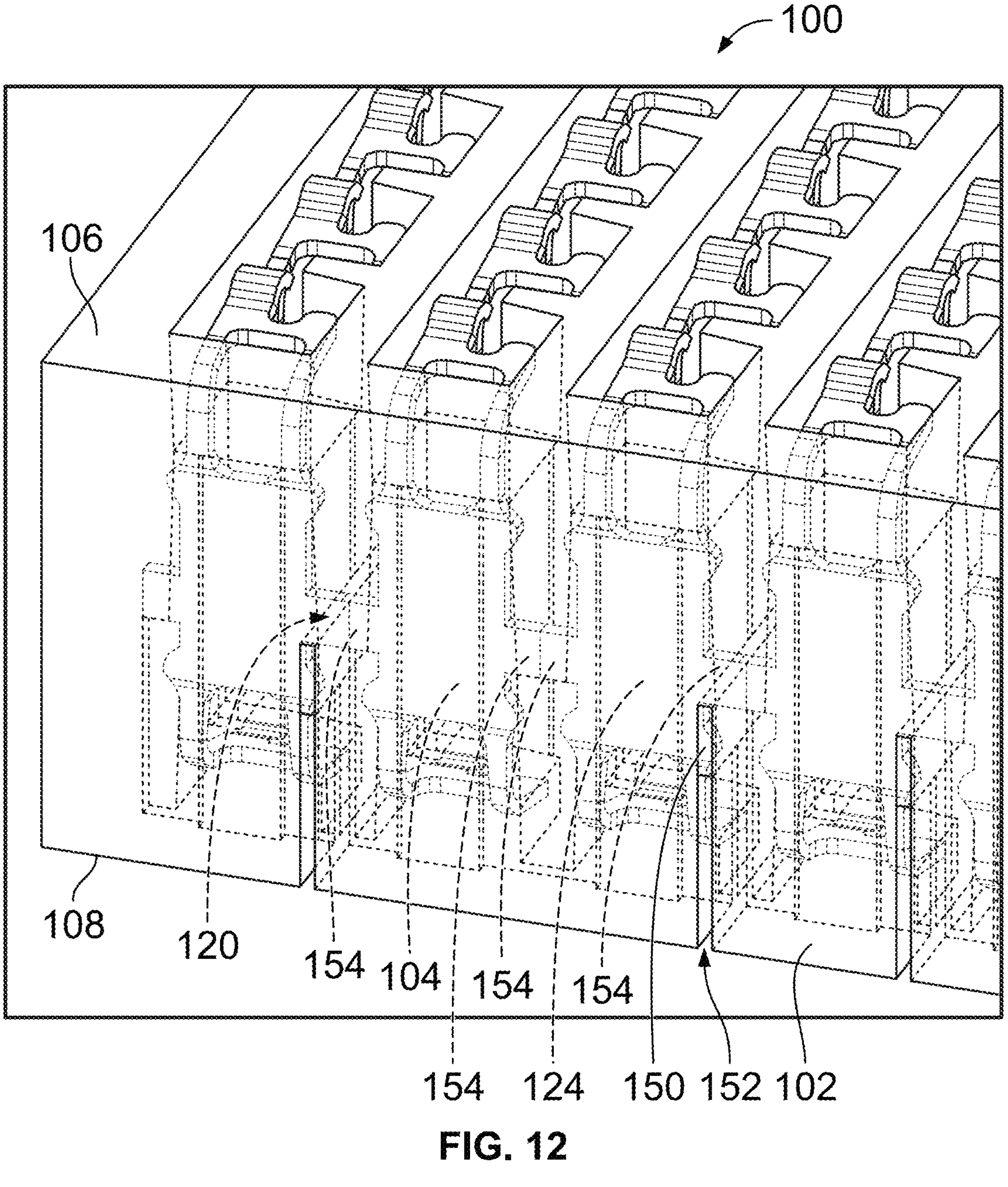
FIG. 12 is a perspective view of a portion of the socket connector in accordance with an exemplary embodiment showing the socket contacts and the ground bars in the substrate.

FIG. 12 is a perspective view of a portion of the socket connector 100 in accordance with an exemplary embodiment showing the socket contacts 104 and the ground bars 150 in the substrate 102. The substrate 102 includes the ground bar slots 152. In the illustrated embodiments, the ground bar slots 152 are open at the lower surface 108 to receive the ground bars 150. The ground bar slots 152 are located between the contact channels 110. For example, the ground bar slots 152 are aligned with the connecting tabs 154. The ground bars 150 are loaded into the ground bar slots 152 to interface with the connecting tabs 154. The connecting tabs 154 are received in the pockets 190. The ground bars 150 electrically connect a plurality of the ground socket contacts 124.

In an exemplary embodiment, the ground band 120 (for example, the ground bars 150 and the connecting tabs 154) are approximately centered vertically between the upper surface 106 and the lower surface 108. The ground band 120 defines an electrical ground plane connecting the ground socket contacts 124 at a location between the upper and lower electrical components 12, 14 (shown in FIG. 1). The ground band 120 reduces the lengths of the ground paths between the ground planes, which increases in the first frequency of resonance for insertion loss, return loss, near-end crosstalk, far-end crosstalk, and the like beyond a target frequency, such as 60 GHz, to improve electrical performance of the socket connector 100.

Figure 13:
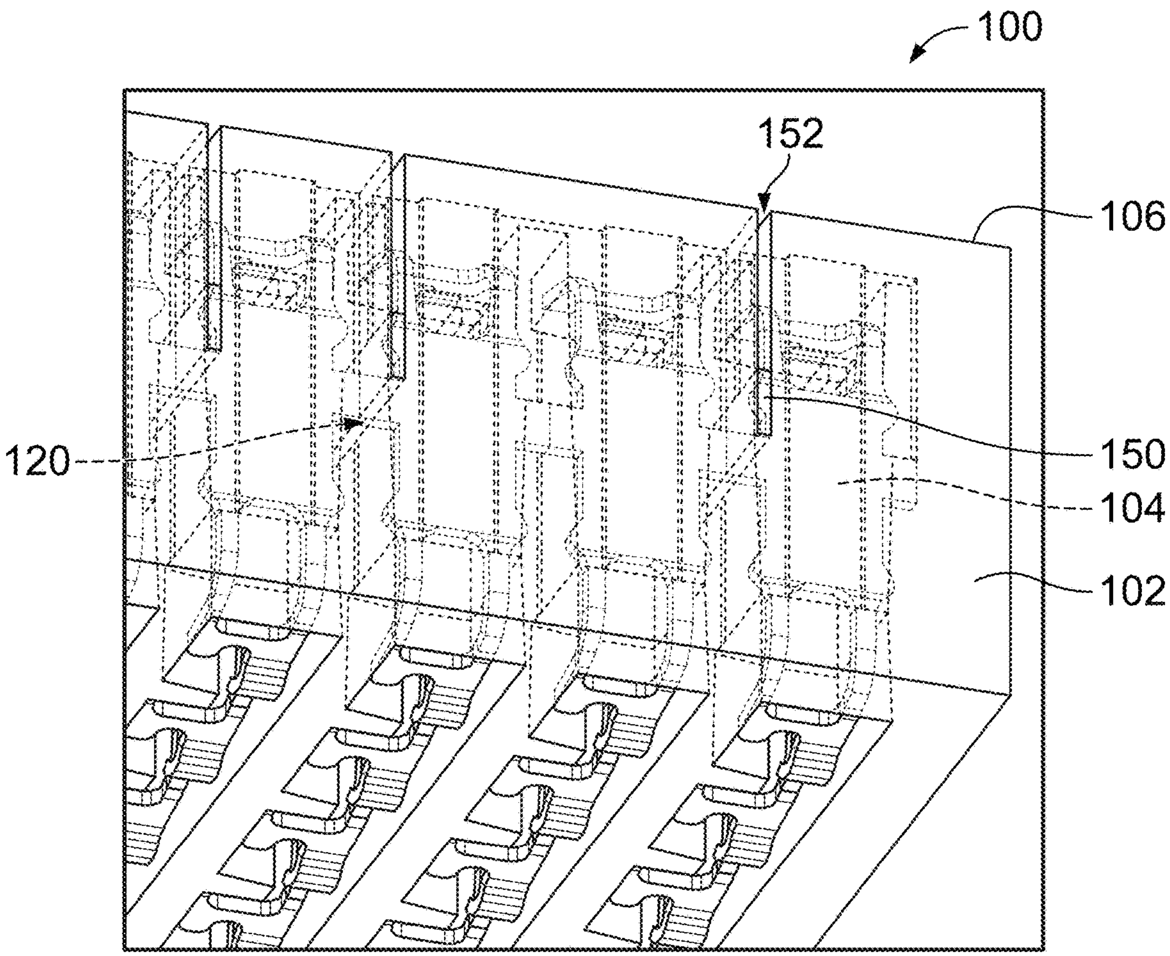
FIG. 13 is a perspective view of a portion of the socket connector in accordance with an exemplary embodiment showing the socket contacts and the ground bars in the substrate.

FIG. 13 is a perspective view of a portion of the socket connector 100 in accordance with an exemplary embodiment showing the socket contacts 104 and the ground bars 150 in the substrate 102. In the illustrated embodiment, the ground bar slots 152 are open at the upper surface 106 to receive the ground bars 150. The ground bars 150 are loaded into the ground bar slots 152 to a central location of the substrate 102, such as to locate the ground band 120 approximately centered between the ground planes of the upper and lower electrical components 12, 14 (shown in FIG. 1).

Figure 14:
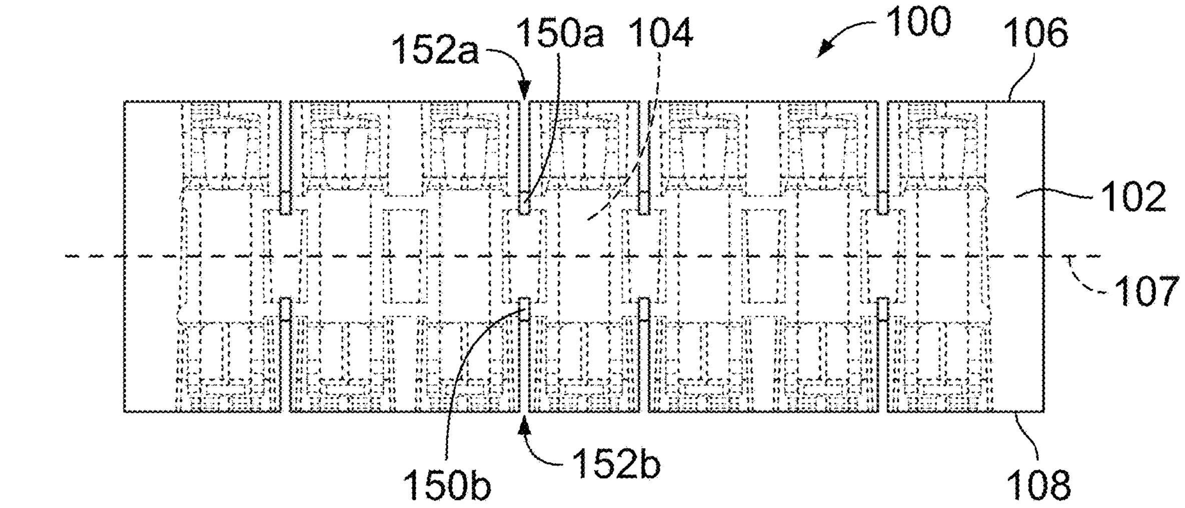
FIG. 14 is an end view of a portion of the socket connector in accordance with an exemplary embodiment showing the socket contacts and the ground bars in the substrate.

FIG. 14 is an end view of a portion of the socket connector 100 in accordance with an exemplary embodiment showing the socket contacts 104 and the ground bars 150 in the substrate 102. In the illustrated embodiment, the substrate 102 includes upper ground bar slots **152*a* open at the upper surface 106 and lower ground bar slots 152*b* open at the lower surface 108. The upper ground bar slots 152*a* receive upper ground bars 150*a*. The lower ground bar slots 152*b* receive lower ground bars 150*b***.

The upper ground bars **150*a* are located at a location within the interior of the substrate 102 below the upper surface 106 and above a mid-plane 107 of the substrate 102. The upper ground bars 150*a* may be approximately centered between the upper surface 106 and the mid-plane 107. Alternatively, the upper ground bars 150*a* may be closer to the upper surface 106 or closer to the mid-plane 107**.

The lower ground bars **150*b* are located at a location within the interior of the substrate 102 above the lower surface 108 and below the mid-plane 107 of the substrate 102. The lower ground bars 150*b* may be approximately centered between the lower surface 108 and the mid-plane 107. Alternatively, the lower ground bars 150*b* may be closer to the lower surface 108 or closer to the mid-plane 107**.

In the illustrated embodiment, the upper and lower ground bars **150*a*, 150*b* are located approximately equi-distant from each other and equi-distant from the upper and lower surfaces 106, 108, respectively (for example, approximately ⅓ of the height of the substrate 102**).

Figure 15:
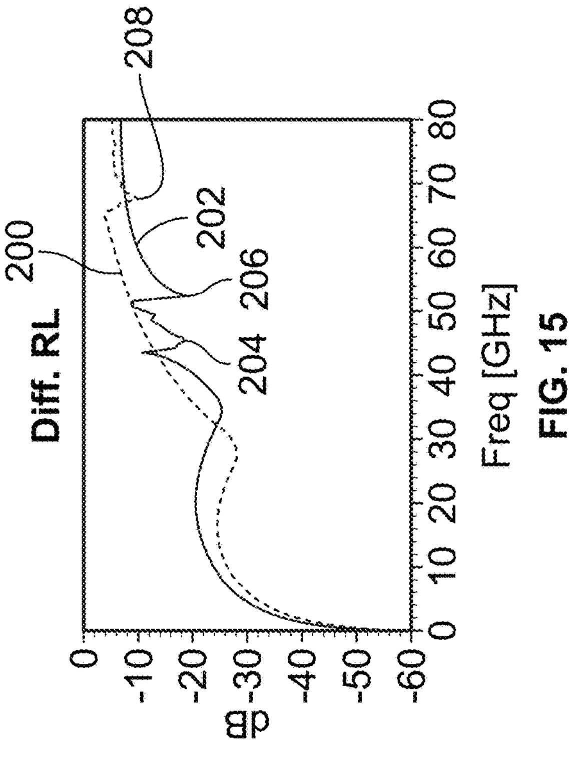
FIG. 15 is a graph illustrating return loss of the socket connector including the ground band compared to return loss of a conventional socket connector that does not include an internal ground plane in accordance with an exemplary embodiment.

FIG. 15 is a graph illustrating return loss 200 of the socket connector 100 including the ground band 120 compared to return loss 202 of a conventional socket connector that does not include an internal ground plane. The results show an improvement in return loss electrical performance in the socket connector 100 including the ground band 120. For example, the return loss 202 of the conventional socket connector has dips 204, 206 at approximately 45 GHz and 55 GHz, whereas the return loss 200 of the socket connector 100 including the ground band 120 has a dip 208 at approximately 70 GHz. As such, the electrical performance of socket connector 100 including the ground band 120 is improved and may be operated in a target frequency, such as at or above 60 GHz, more efficiently than the conventional socket connector.

Figure 16:
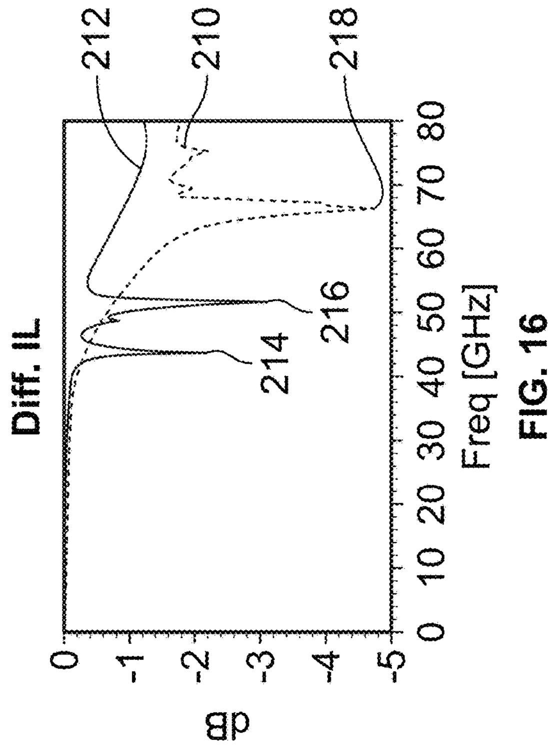
FIG. 16 is a graph illustrating insertion loss of the socket connector including the ground band compared to insertion loss of a conventional socket connector that does not include an internal ground plane in accordance with an exemplary embodiment.

FIG. 16 is a graph illustrating insertion loss 210 of the socket connector 100 including the ground band 120 compared to insertion loss 212 of a conventional socket connector that does not include an internal ground plane. The results show an improvement in insertion loss electrical performance in the socket connector 100 including the ground band 120. For example, the insertion loss 212 of the conventional socket connector has dips 214, 216 at approximately 42 GHz and 52 GHz, whereas the insertion loss 210 of the socket connector 100 including the ground band 120 has a dip 218 at approximately 66 GHz. As such, the electrical performance of socket connector 100 including the ground band 120 is improved and may be operated in a target frequency, such as 60 GHz, more efficiently than the conventional socket connector.

Figure 17:
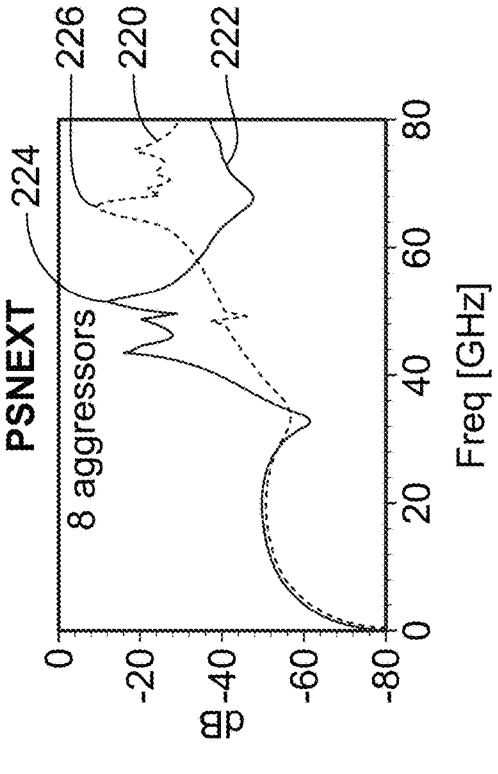
FIG. 17 is a graph illustrating near end cross talk of the socket connector including the ground band compared to near end cross talk of a conventional socket connector that does not include an internal ground plane in accordance with an exemplary embodiment.

FIG. 17 is a graph illustrating near end cross talk 220 of the socket connector 100 including the ground band 120 compared to near end cross talk 222 of a conventional socket connector that does not include an internal ground plane. The results show an improvement in near end cross talk electrical performance in the socket connector 100 including the ground band 120. For example, the near end cross talk 222 of the conventional socket connector has a peak 224 at approximately 55 GHz, whereas the near end cross talk 220 of the socket connector 100 including the ground band 120 has a peak 226 at approximately 70 GHz. As such, the electrical performance of socket connector 100 including the ground band 120 is improved and may be operated in a target frequency, such as 60 GHz, more efficiently than the conventional socket connector.

Figure 18:
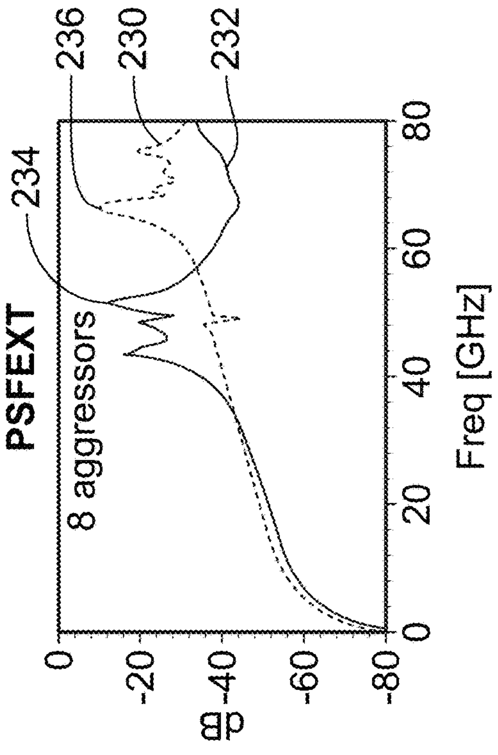
FIG. 18 is a graph illustrating far end cross talk of the socket connector including the ground band compared to far end cross talk of a conventional socket connector that does not include an internal ground plane in accordance with an exemplary embodiment.

FIG. 18 is a graph illustrating far end cross talk 230 of the socket connector 100 including the ground band 120 compared to far end cross talk 232 of a conventional socket connector that does not include an internal ground plane. The results show an improvement in far end cross talk electrical performance in the socket connector 100 including the ground band 120. For example, the far end cross talk 232 of the conventional socket connector has a peak 234 at approximately 55 GHz, whereas the far end cross talk 230 of the socket connector 100 including the ground band 120 has a peak 236 at approximately 65 GHz. As such, the electrical performance of socket connector 100 including the ground band 120 is improved and may be operated in a target frequency, such as 60 GHz, more efficiently than the conventional socket connector.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A socket connector comprising:

a substrate having an upper surface and a lower surface, the substrate including signal contact channels between the upper and lower surfaces and ground contact channels between the upper and lower surfaces, the substrate including ground bar slots;

signal socket contacts received in the corresponding signal contact channels, each signal socket contact including a signal contact body, an upper signal mating element, and a lower signal mating element, the upper signal mating element deflectable relative to the contact body and extending to the upper surface to interface with a first electrical component, the lower signal mating element configured to electrically connect with a second electrical component;

ground socket contacts received in the corresponding ground contact channels, each ground socket contact including a ground contact body, an upper ground mating element, and a lower ground mating element, the upper ground mating element deflectable relative to the contact body and extending to the upper surface to interface with a first electrical component, the lower ground mating element configured to electrically connect with a second electrical component; and ground bars received in corresponding ground bar slots, the ground bars electrically connecting the corresponding ground socket contacts;

wherein the signal socket contacts and the ground socket contacts are arranged in an array, the signal socket contacts being arranged in pairs, the ground socket contacts including flanking ground socket contacts in line with the pairs of the signal socket contacts, the ground socket contacts including separating ground socket contacts separating the pairs of the signal socket contacts, the ground bars connecting the separating ground socket contacts and the flanking ground socket contacts.

2. The socket connector of claim 1, wherein the ground bars are approximately centered between the upper surface and the lower surface.

3. The socket connector of claim 1, wherein each ground bar is electrically connected to at least three of the ground socket contacts.

4. The socket connector of claim 1, wherein the ground socket contacts are arranged in rows and columns, the ground socket contacts in the rows being electrically connected to each other by connecting tabs, the ground socket contacts in the columns being electrically connected to each other by the ground bars.

5. The socket connector of claim 1, wherein the ground socket contacts are stamped and formed contacts, wherein a plurality of the ground socket contacts are formed integral with each other on a carrier strip, the ground socket contacts being loaded into the substrate with the carrier strip, the carrier strip electrically connecting the corresponding ground socket contacts.

6. The socket connector of claim 1, wherein the signal socket contacts and the ground socket contacts are stamped and formed contacts, the signal socket contacts being separate from and electrically isolated from the adjacent signal socket contact and from the adjacent ground socket contacts.

7. The socket connector of claim 1, wherein the signal socket contacts and the ground socket contacts are arranged in an array, the signal socket contacts being arranged in pairs, the ground socket contacts providing shielding around the pairs of the signal socket contacts, the ground bars connecting the ground socket contacts surrounding the pairs of the signal socket contacts.

8. The socket connector of claim 1, wherein each signal contact body includes opposite first and second sides and wherein each ground contact body includes opposite first and second sides, the ground bars extending in gaps between the sides of the signal contact bodies and the sides of the ground contact bodies.

9. The socket connector of claim 1, wherein the ground socket contacts include connecting tabs extending between the corresponding ground socket contacts, the ground bars electrically engaging the corresponding connecting tabs between the corresponding ground socket contacts to electrically connect the corresponding ground socket contacts.

10. The socket connector of claim 9, wherein the ground bars extend perpendicular to the connecting tabs.

11. The socket connector of claim 1, wherein each ground bar includes pockets, the pockets receiving connecting tabs extending from the corresponding ground socket contacts.

12. The socket connector of claim 11, wherein each ground bar includes compliant beams extending into the pockets, the compliant beams being electrically connected to the corresponding ground socket contacts.

13. The socket connector of claim 1, wherein the ground bar slots are upper ground bar slots open at the upper surface, the substrate including lower ground bar slots open at the lower surface, the ground bars being upper ground bars, the socket connector further comprising lower ground bars received in corresponding lower ground bar slots, the lower ground bars electrically connecting the corresponding ground socket contacts.

14. The socket connector of claim 13, wherein the substrate has a midplane between the upper surface and the lower surface, the upper ground bars being positioned between the upper surface and the midplane, the lower ground bars being positioned between the lower surface and the midplane.

15. A socket connector comprising:

a substrate having an upper surface and a lower surface, the substrate including signal contact channels between the upper and lower surfaces and ground contact channels between the upper and lower surfaces, the substrate including ground bar slots;

signal socket contacts received in the corresponding signal contact channels, each signal socket contact including a signal contact body, an upper signal mating element, and a lower signal mating element, the upper signal mating element deflectable relative to the contact body and extending to the upper surface to interface with a first electrical component, the lower signal mating element configured to be electrically connected with a second electrical component;

ground socket contacts received in the corresponding ground contact channels, the ground socket contacts being arranged in rows and columns, each ground socket contact including a ground contact body, an upper ground mating element, and a lower ground mating element, the upper ground mating element deflectable relative to the contact body and extending to the upper surface to interface with a first electrical component, the lower ground mating element configured to be electrically connected with a second electrical component, the ground socket contacts including connecting tabs extending between corresponding ground socket contacts, wherein the ground socket contacts in the rows are electrically connected to each other by the connecting tabs; and ground bars received in corresponding ground bar slots, the ground bars electrically engaging the corresponding connecting tabs between the corresponding ground socket contacts to electrically connect the corresponding ground socket contacts, wherein the ground socket contacts in the columns are electrically connected to each other by the ground bars.

16. The socket connector of claim 15, wherein the signal socket contacts and the ground socket contacts are arranged in an array, the signal socket contacts being arranged in pairs, the ground socket contacts including flanking ground socket contacts in line with the pairs of the signal socket contacts, the ground socket contacts including separating ground socket contacts separating the pairs of the signal socket contacts, the ground bars connecting the separating ground socket contacts and the flanking ground socket contacts.

17. The socket connector of claim 15, wherein the ground bars are approximately centered between the upper surface and the lower surface.

18. The socket connector of claim 17, wherein the ground bars extend perpendicular to the connecting tabs.

19. A socket connector comprising:

a substrate having an upper surface and a lower surface, the substrate including signal contact channels between the upper and lower surfaces and ground contact channels between the upper and lower surfaces, the substrate including upper ground bar slots open at the upper surface and lower ground bar slots open at the lower surface, the substrate including a midplane between the upper surface and the lower surface;

signal socket contacts received in the corresponding signal contact channels, each signal socket contact including a signal contact body, an upper signal mating element, and a lower signal mating element, the upper signal mating element deflectable relative to the contact body and extending to the upper surface to interface with a first electrical component, the lower signal mating element configured to be electrically connected with a second electrical component;

ground socket contacts received in the corresponding ground contact channels, each ground socket contact including a ground contact body, an upper ground mating element, and a lower ground mating element, the ground signal mating element deflectable relative to the contact body and extending to the upper surface to interface with a first electrical component, the lower ground mating element configured to be electrically connected with a second electrical component;

upper ground bars received in the corresponding upper ground bar slots, the ground bars electrically connecting the corresponding ground socket contacts; and lower ground bars received in the corresponding lower ground bar slots, the lower ground bars electrically connecting the corresponding ground socket contacts;

wherein the upper ground bars are positioned between the upper surface and the midplane and the lower ground bars are positioned between the lower surface and the midplane.

20. The socket connector of claim 19, wherein the signal socket contacts and the ground socket contacts are arranged in an array, the signal socket contacts being arranged in pairs, the ground socket contacts including flanking ground socket contacts in line with the pairs of the signal socket contacts, the ground socket contacts including separating ground socket contacts separating the pairs of the signal socket contacts, the ground bars connecting the separating ground socket contacts and the flanking ground socket contacts.

* * * * *